United States Patent
Falkenburg et al.

(10) Patent No.: US 10,031,919 B2
(45) Date of Patent: *Jul. 24, 2018

(54) MANAGEMENT OF ACCESS TO DATA DISTRIBUTED ACROSS MULTIPLE COMPUTING DEVICES

(71) Applicant: Apple Inc., Cupertino, CA (US)

(72) Inventors: David Robbins Falkenburg, San Jose, CA (US); Michael J. Nugent, Cupertino, CA (US); Duncan Robert Kerr, San Francisco, CA (US); Aaron Leiba, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/106,299

(22) Filed: Dec. 13, 2013

(65) Prior Publication Data

US 2014/0172798 A1 Jun. 19, 2014

Related U.S. Application Data

(63) Continuation of application No. 12/571,254, filed on Sep. 30, 2009, now Pat. No. 8,645,327.

(51) Int. Cl.
*G06F 17/30* (2006.01)

(52) U.S. Cl.
CPC .. *G06F 17/30094* (2013.01); *G06F 17/30174* (2013.01)

(58) Field of Classification Search
CPC .......................... G06F 3/067; G06F 17/30094

USPC ....... 707/610, 612, 622, 636, 711, 827, 831, 707/828

See application file for complete search history.

(56) References Cited

U.S. PATENT DOCUMENTS

| | | | |
|---|---|---|---|
| 6,438,642 B1 * | 8/2002 | Shaath | 711/100 |
| 6,556,998 B1 * | 4/2003 | Mukherjee et al. | 707/999.001 |
| 6,742,114 B1 * | 5/2004 | Carter et al. | 709/201 |
| 7,062,490 B2 * | 6/2006 | Adya et al. | 707/999.001 |
| 8,898,161 B2 * | 11/2014 | Grant et al. | 707/735 |
| 2003/0018700 A1 * | 1/2003 | Giroti et al. | 709/201 |
| 2005/0050028 A1 * | 3/2005 | Rose et al. | 707/3 |
| 2006/0112143 A1 * | 5/2006 | Subramanian | 707/104.1 |
| 2006/0161635 A1 * | 7/2006 | Lamkin et al. | 709/217 |
| 2007/0002011 A1 * | 1/2007 | Kurlander et al. | 345/156 |
| 2007/0112742 A1 * | 5/2007 | Dumais et al. | 707/3 |
| 2007/0299796 A1 * | 12/2007 | Macbeth et al. | 706/16 |
| 2008/0086483 A1 * | 4/2008 | Park et al. | 707/10 |
| 2008/0160974 A1 * | 7/2008 | Vartiainen et al. | 455/414.3 |
| 2009/0043740 A1 * | 2/2009 | Olsen | 707/3 |

(Continued)

*Primary Examiner* — Heather R Herndon
*Assistant Examiner* — Thuy T Bui
(74) *Attorney, Agent, or Firm* — Fletcher Yoder, P.C.

(57) ABSTRACT

Methods, systems and apparatus for a distributed data environment in which data can be seamlessly accessed from remote computing devices are disclosed. For a given user having multiple computing devices, a personal distributed data bank can be formed from data storage capacities resident at the multiple computing device. The given user can access data on any of the multiple computing devices without knowing on which of the multiple computing devices the data resides. In one embodiment, an index for the user's data within the personal distributed data bank can be provided to facilitate searching, browsing and accessing of user data by the given user.

18 Claims, 9 Drawing Sheets

(56) References Cited

U.S. PATENT DOCUMENTS

2009/0234902 A1* 9/2009 Pilosof .................. 709/201
2009/0259711 A1* 10/2009 Drieu et al. ............ 709/201
2009/0282169 A1* 11/2009 Kumar et al. .......... 709/248
2011/0066668 A1* 3/2011 Guarraci ................ 707/831

* cited by examiner

INDEX ~ 500

| NAME | LOCATION | SIZE (MB) | FORMAT | TIMESTAMP |
|---|---|---|---|---|
| file 1 | Home_PC | 0.6 | pdf | xxx |
| file 2 | Home_PC | 2.8 | JPEG | xxx |
| file 3 | Home_PC; Work_PC | 0.5; 2.5 | Word | xxx |
| file 4 | Work_PC | 0.2 | Word | xxx |
| file 8 | Smart_Phone | 0.2 | JPEG | xxx |
| file 9 | Smart_Phone | 0.4 | pdf | xxx |
| file 10 | Smart_Phone | 0.3 | Word | xxx |

FIG. 5

MANAGEMENT OF ACCESS TO DATA DISTRIBUTED ACROSS MULTIPLE COMPUTING DEVICES

RELATED APPLICATIONS

The instant application is a continuation of, and hereby claims priority under 35 U.S.C. § 120 to, U.S. patent application Ser. No. 12/571,254, which is titled "Management of Access to Data Distributed across Multiple Computing Devices" by inventors David Robbins Falkenburg, Michael J. Nugent, Duncan Robert Kerr, and Aaron Leiba, which was filed on 30 Sep. 2009, which issued as U.S. Pat. No. 8,645,327 on 4 Feb. 2014, and which is incorporated by reference.

BACKGROUND OF THE INVENTION

Field of the Invention

The present invention relates to accessing remote data and, more particularly, to accessing user data stored on multiple computing devices associated with a user.

Description of the Related Art

Today, users tend to utilize many different computers. As a result, users store various electronic files on the different computers.

Portable memory devices can allow users to effectively move the data from one computer to another. Portable memory devices, such as memory sticks, are small peripheral devices that provide data storage. Users today often store electronic files on portable memory devices when they intend to utilize on different computers. It is also common for users to either send themselves an electronic mail message having attached electronic files or copy electronic files to a remote storage server (e.g., virtual remote storage drive). The electronic mail message or the remote storage server allows the user to access to the data from different computing devices that are able have network access.

Unfortunately, however, these conventional approaches require that users take actions in advance to see to ensure that particular electronic files are available. For example, the advance action can require that the electronic files be: (i) copied to a portable memory device, (ii) emailed to oneself, or (iii) copied to a remote storage server. If careful preparations to make the needed electronic files available are not taken, then the user will not have access to the needed electronic files when at another computing device.

Therefore, there remains a need for improved techniques for accessing data from multiple computing devices.

SUMMARY

The invention pertains to methods, systems and apparatus for a distributed data environment in which data can be seamlessly accessed from remote computing devices. For a given user having multiple computing devices, a personal distributed data bank can be formed from data storage capacities resident at the multiple computing device. The given user can access data on any of the multiple computing devices without knowing on which of the multiple computing devices the data resides. In one embodiment, an index for the user's data within the personal distributed data bank can be provided to facilitate searching, browsing and accessing of user data by the given user.

The invention can be implemented in numerous ways, including as a method, system, device, apparatus (including computer readable medium and graphical user interface). Several embodiments of the invention are discussed below.

As a method for accessing distributed data, one embodiment can, for example, include at least: associating a plurality of different computing devices to a particular user; forming a distributed personal data bank using data storage of the different computing devices; maintaining an index of electronic data available in the distributed personal data bank; and accessing electronic data in the distributed personal data bank using the index. The index can be available and maintained on each of the different computing devices via one or more wired or wireless networks. The data in the distributed personal data bank can be accessible from any of the different computing devices via the one or more wired or wireless networks.

As a method for accessing distributed data, another embodiment can, for example, include at least: associating a plurality of different computing devices to a particular user; configuring distributed data policies applicable to data stored on the different computing devices; and maintaining an index of data available to the particular user on the different computing devices via one or more wired or wireless networks.

As a computer readable medium including at least computer program code stored thereon and executable by a computing device for accessing distributed data, one embodiment can, for example, include at least: computer program code for associating a plurality of different computing devices to a particular user; computer program code for forming a distributed personal data bank using data storage of the different computing devices; computer program code for maintaining an index of electronic data available in the distributed personal data bank; and computer program code for accessing electronic data in the distributed personal data bank using the index. The index can be available and maintained on each of the different computing devices. The data in the distributed personal data bank can be accessible from any of the different computing devices.

As a distributed data management system, one embodiment can, for example, include at least: a plurality of computing devices associated with a particular user, where at least one of the computing devices is a portable computing device, where each of the computing devices has data storage that stores one or more electronic files associated with the particular user; and a distributed data access module configured to access the electronic files stored in the data storage of any of the computing devices associated with the particular user. An electronic file to be accessed at one of the computing devices can be retrieved from another of the computing devices automatically and seamlessly.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which:

FIG. 5 illustrates an exemplary representation of an index according to one embodiment on the invention.

DETAILED DESCRIPTION OF EMBODIMENTS OF THE INVENTION

The invention pertains to methods, systems and apparatus for a distributed data environment in which data can be seamlessly accessed from remote computing devices. For a given user having multiple computing devices, a personal distributed data bank can be formed from data storage capacities resident at the multiple computing device. The given user can access data on any of the multiple computing devices without knowing on which of the multiple computing devices the data resides. In one embodiment, an index for the user's data within the personal distributed data bank can be provided to facilitate searching, browsing and accessing of user data by the given user.

Each of the computing devices can, for example, be a personal computer (e.g., desktop computer, notebook computer or netbook computer), or a portable handheld electronic device (e.g., Portable Digital Assistant (PDA), multi-function mobile telephone).

Embodiments of various aspects of the invention are discussed below with reference to FIGS. 1-8. However, those skilled in the art will readily appreciate that the detailed description given herein with respect to these figures is for explanatory purposes as the invention extends beyond these limited embodiments.

Figure 1:
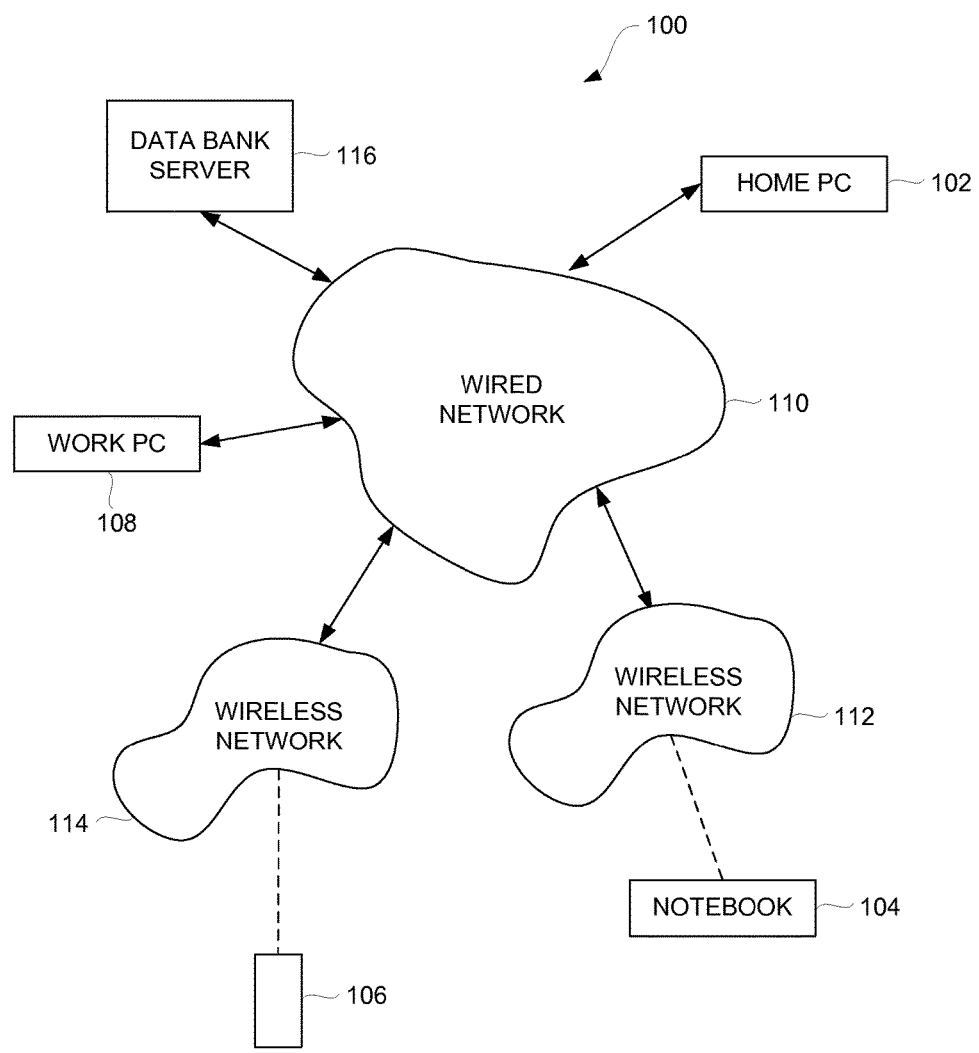
FIG. 1 is a block diagram of the distributed data management system 100 according to one embodiment of the invention.

FIG. 1 is a block diagram of a distributed data management system 100 according to one embodiment of the invention. The distributed data management system 100 operates to intelligently distribute data associated with a user across a plurality of different computing devices associated with that user. In the embodiment illustrated in FIG. 1, the distributed data management system 100 manages data distribution amongst a home personal computer 102, a notebook computer 104, a multi-function mobile telephone 106 (e.g., smart phone), and a work personal computer 108. These computing devices 102-108 are all associated with the user and can be interconnected via one or more data networks. The data networks can include wired or wireless networks. In the embodiment illustrated in FIG. 1, the home personal computer 102 and the work personal computer 108 can couple to the wired network 110. The notebook computer 104 can couple to a wireless network 112 which in turn can couple to a wired network 110. The multi-function mobile telephone 106 can couple to a wireless network 114 which can couple to the wired network 110. The wireless network 112 can, for example, pertain to a wireless LAN, WiFi, or WiMax network. The wireless network 114 can be similar to the wireless network 112 or can be a cellular communication network.

According to the distributed data management system 100, data residing at any of the computing devices that are associated with and authorized by a particular user can be shared amongst the computing devices. For example, a document created by the particular user while operating the notebook computer 104, even though stored on the notebook computer 104, can be accessed by the home personal computer 102 via the one or more networks 110-114. Similarly, a document created by the particular user while interacting with the multi-function mobile telephone 106 can be accessed by the work personal computer 108 via one or more of the networks 110-114. In general, then, any one computing devices 10-108 can access data resident on any other computing devices 102-108, so long as the computing devices 102-108 are associated with the particular user and authorized for data distribution.

The distributed data management system 100 can further include a data bank server 116. The data bank server 116 can assist with the data management and distribution provided by the distributed data management system 100. The data bank server 116 can operate as a central storage location for an index representing the data available from any and all of the computing devices. For example, the particular user will have an index that identifies data items for which the particular user can access. These data items can reside on any of the computing devices 102-108. The index itself can also be stored on each of the computing devices 102-108. Still further, in one embodiment, the data bank server 106 can further store some or all of the data available to the authorized user. The data stored by the data bank server 116 can be utilized for general data retrieval or for backup or redundancy purposes.

Figure 2A:
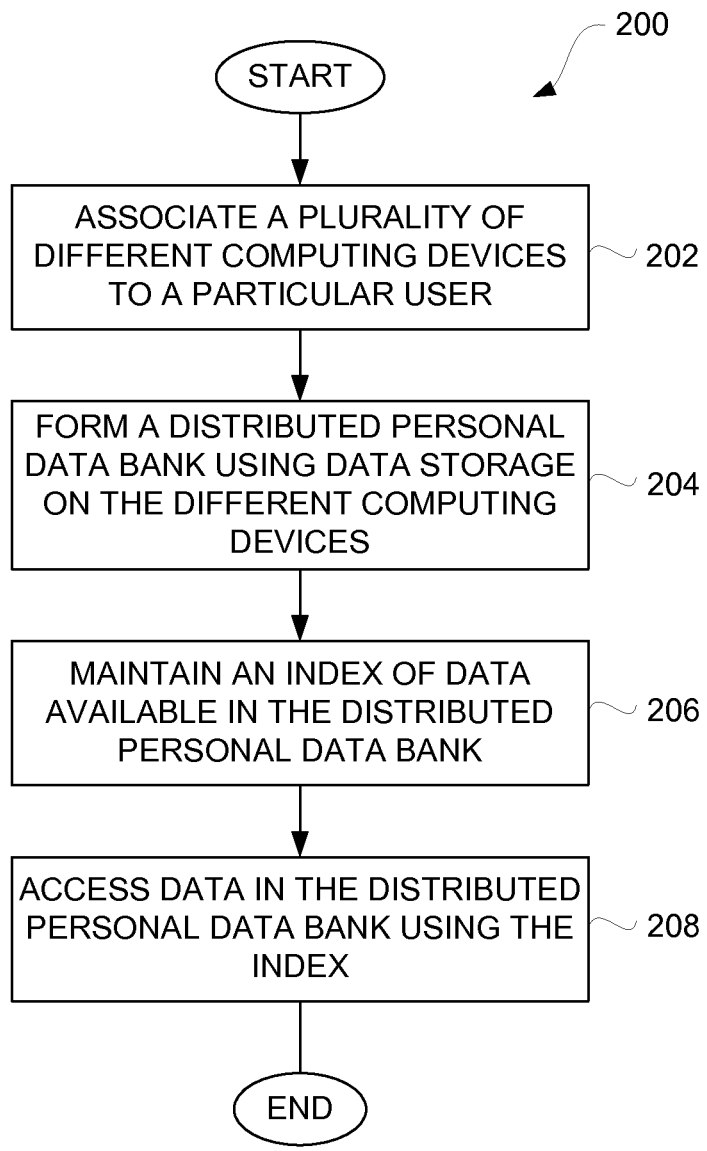
FIG. 2A is a flow diagram of a distributed data access method according to one embodiment of the invention.

FIG. 2A is a flow diagram of a distributed data access method 200 according to one embodiment of the invention. The distributed data access method 200 can, for example, be provided by the distributed data management system 100. In one implementation, the data bank server 116 can centrally manage data indexing and data distribution. In another implementation, one or more of computing devices associated with a user can (separately or together) manage data indexing and data distribution in a distributed manner.

The distributed data access method 200 can associate 202 a plurality of different computing devices to a particular user. For example, the computing devices 102-108 illustrated in FIG. 1 can be associated with a particular user. A distributed personal data bank can be formed 204 using data storage on the different computing devices. Given that the different computing devices are associated with the particular user, the data storage associated with such different computing devices can be considered on an aggregate basis as a distributed personal data bank. In other words, the distributed personal data bank is formed from the data storage associated with the different computing devices.

Additionally, an index of data available in the distributed personal data bank can be maintained 206. The index can identify available data and indicate where data resides (i.e., location) in the distributed personal data bank. The index can also include additional information for each data item (e.g., electronic file) in the distributed data bank. The additional information can, for example, pertain to one or more of: format, size, associated program, timestamp and the like. The additional information can be advantageous to the computing device desirous of receiving the data. Thereafter, data in the distributed personal data bank can be accessed 208 by the particular user using the index. The index allows efficient browsing, searching or retrieving of electronic files with respect to the distributed personal data bank. As a result, although the data is distributed across the various computing devices 102-108, data anywhere within the distributed personal data bank can be accessed efficiently with the assistance of the index which provides information on the location, format, size etc. for the desired data. Following the block 208, the distributed data access method 200 can end.

As noted above, access to data in the distributed personal data bank can make use of the index. The index allows the requesting computing device to be aware of the existence and location (e.g., network address) of various electronic files in the distributed personal data bank. The requesting computing device can present a user interface to the user to inform the use of the electronic files within the distributed personal data bank. Additionally, the index can also indicate current availability of electronic files. Since the various computing devices associated with the user are interconnected via various networks, such computing devices are not always coupled to and accessible via the network(s). Hence, the index can be frequently updated to maintain current information on actual availability. Updates to the index can be periodic as needed. If desired, the index can be updated on a nearly real-time basis if desired.

Furthermore, the index can also include one or more characteristics associated with the electronic files within the distributed personal data bank. The characteristics (or attributes) can vary with implementation. Examples of some characteristics for the electronic files are: format, size, associated application, timestamp, etc. These characteristics can be used to select which of like files (e.g., identical or similar) are to be accessed. These characteristics can also be used to determine whether a conversion (e.g., format conversion) is needed so that the electronic file is usable on the requesting computing device.

Figure 2B:
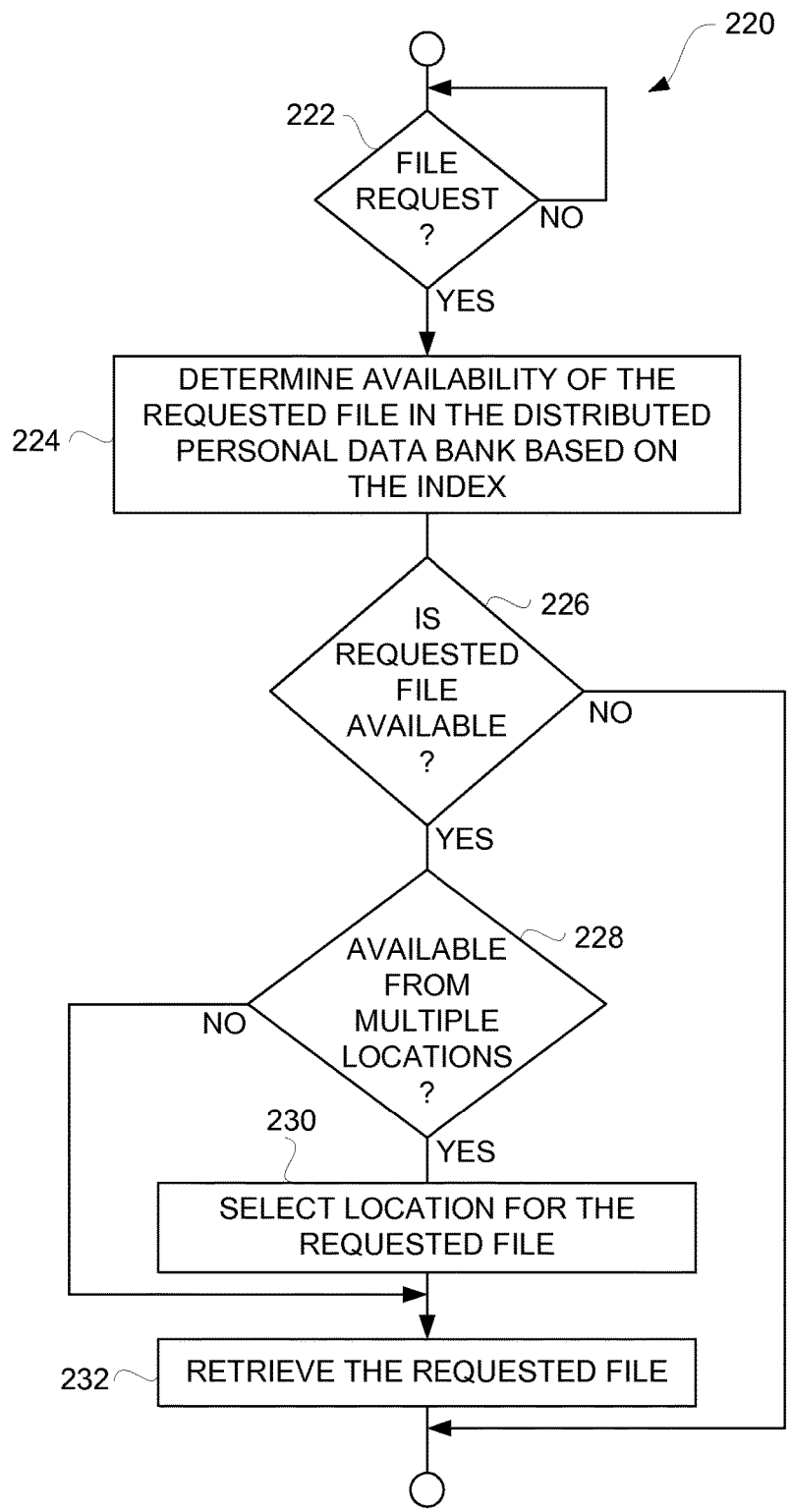
FIG. 2B is a flow diagram of a data access method according to one embodiment of the invention.

FIG. 2B is a flow diagram of a data access method 220 according to one embodiment of the invention. The data access method 220 is, for example, suitable for use as processing associated with the block 208 of the distributed data access method 200 illustrated in FIG. 2A. The data access method 220 can begin with a decision 222 that determines whether a file request has been received. When the decision 222 determines that a file request has not been received, the data access method 220 awaits a file request. It should be noted that data access is normally done in response to a file request. Hence, the data access method 220 can be considered to be invoked when a file request is received.

Once the decision 222 determines that a file request for an electronic file has been received, the availability of the requested file in the distributed personal data bank can be determined 224 based on the index. After the availability of the requested file has been determined 224, a decision 226 can determine whether the requested file is available in the distributed personal data bank. Due to network connectivity or other reasons for interruption, one or more of the computing devices associated with the user may not be accessible. As result, in some cases, the requested file may not be currently available. When the decision 226 determines that the requested file is not currently available, the data access method 220 can end with the requested file not being retrieved.

On the other hand, when the decision 226 determines that the requested file is currently available, a decision 228 can determine whether the requested file is available from multiple locations within the distributed personal data bank. When the decision 228 determines that the requested file is available from multiple locations within the distributed personal data bank, one of the locations for the requested file can be selected 230. The selection 230 of the location for the requested file can be determined by (i) the user that has initiated the file request, (ii) the requesting computing device or (iii) some other computing device. Regardless of whether the location for the requested file is selected manually by the user or automatically by a computing device, following the selection 230, the requested file can be retrieved 232. On the other hand, when the decision 228 determines that the requested file is only available from a single location in the distributed personal data bank, the block 230 can be bypassed and the requested file can then be retrieved 232. Following the block 232, the data access method can 220 end with the requested file having been retrieved. Thereafter, the requested file can be transmitted to the requesting computing device where it can then be utilized by the requesting computing device for the benefit of the user.

Figure 2C:
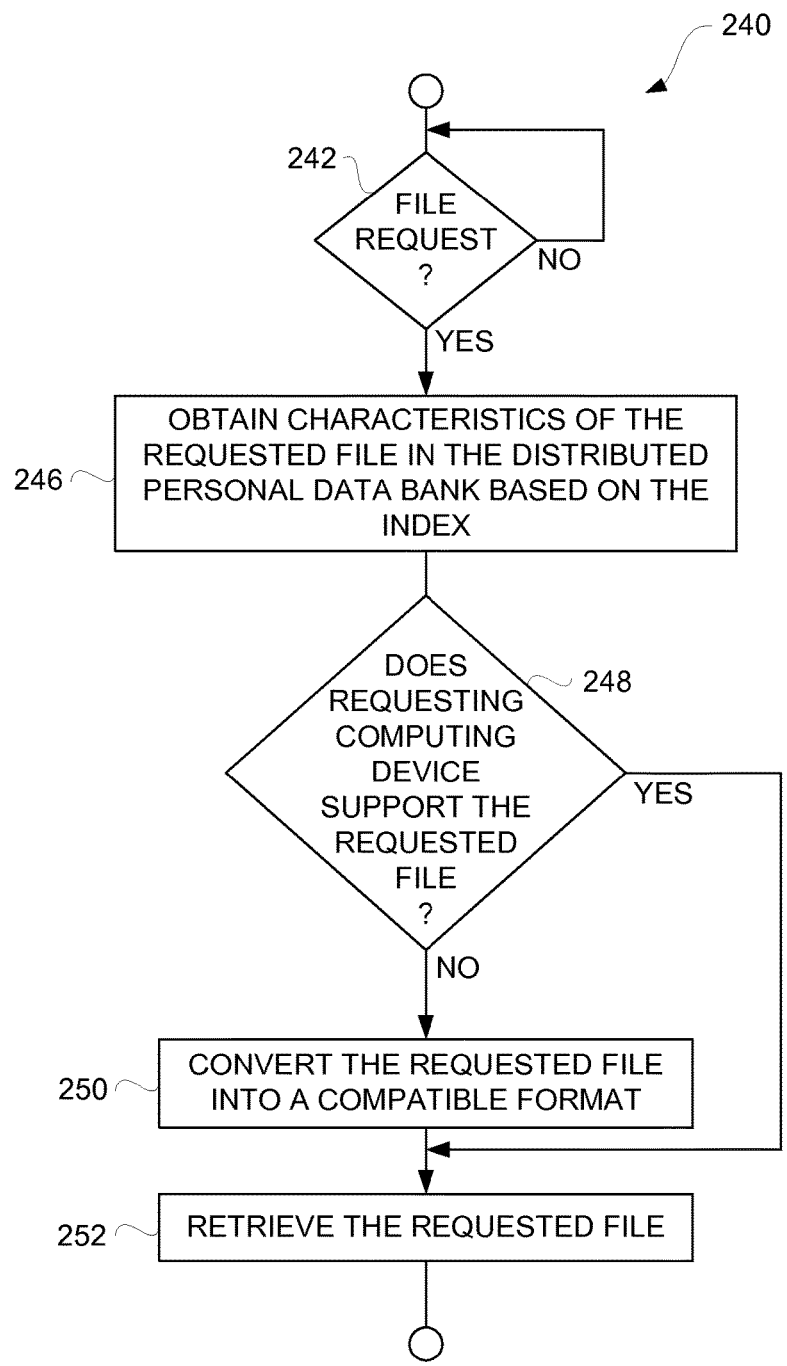
FIG. 2C is a flow diagram of a data access method according to another embodiment of the invention.

FIG. 2C is a flow diagram of a data access method 240 according to another embodiment of the invention. The data access method 240 is, for example, suitable for use as processing associated with the block 208 of the distributed data access method 200 illustrated in FIG. 2A. The data access method 240 can begin with a decision 242 that determines whether a file request has been received. When the decision 242 determines that a file request has not been received, the data access method 240 awaits a file request. It should be noted that data access is normally done in response to a file request. Hence, the data access method 240 can be considered to be invoked when a file request is received.

Once the decision 242 determines that a file request for an electronic file has been received, characteristics of the requested file in the distributed personal data bank can be obtained 246 based on the index. As noted above, in one embodiment, the index can include one or more characteristics associated with the electronic files identified therein. Here, one of more of the characteristics of the requested file can be obtained 246.

Next, a decision 248 can determine whether the requesting computing device supports the requested file. The requesting computing device is the computing device from which the electronic file has been requested. For example, the characteristics of the requested file can specify a format of the requested file. When the decision 248 determines that the requesting computing device does not support the requested file, the requested file can be converted 250 into a compatible format. The requesting computing device must be able to present the requested file having its particular format. For example, the requesting computing device may have a low resolution display that it is unable to render high resolution graphics. In such an example, the requesting computing device can be understood to not support the high-resolution format of the requested file. Hence, for this example, the requested file could be converted into a low resolution format. As another example, the requesting computing device may not have an application program needed to open the requested file. In such an example, the requested file could be converted into another format such that the requested file is usable, even if only able to be viewed at the requesting computing device. Alternatively, when the decision 248 determines that the requesting computing device does support the requested file, the block 250 can be bypassed. Following the block 250 or bypass of the block 250, the requested file can be retrieved 252. Following the block 252, the data access method 240 can end with the requested file having been converted 250 if needed. Thereafter, the requested file can be transmitted to the requesting computing device where it can then be utilized by the requesting computing device for the benefit of the user.

Figure 3:
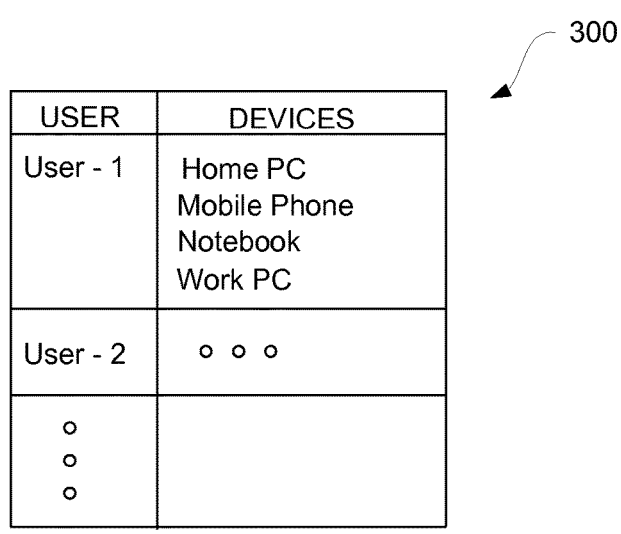
FIG. 3 illustrates an exemplary authorization table according to one embodiment of the invention.

FIG. 3 illustrates an exemplary authorization table 300 according to one embodiment of the invention. The authorization table 300 specifies one or more computing devices that are associated a user. The authorization table 300 can identify associations for a single user (e.g., user-1) or may include associations for each of a plurality of different users (e.g., user-1, user-2, ... ). In any case, the authorization table 300 specifies one or more computing devices associated with a single user. As illustrated in FIG. 3, a particular user (user-1) is associated with four different computing devices, which are labeled or identified as Home PC, Mobile Phone, Notebook and Work PC. In this illustrative example, these authorized computing devices correspond to the computing devices 102-108 illustrated in FIG. 1. Consequently, data residing on data storage associated with any of the authorized computing devices can be accessed by and distributed for the particular user. Although the associated computing device are labeled or identified with textual names (e.g., Home PC) in the authorization table 300, more generally the devices are uniquely identified by one or more of name, serial number, assigned identifier, network address, and user account.

Figure 4:
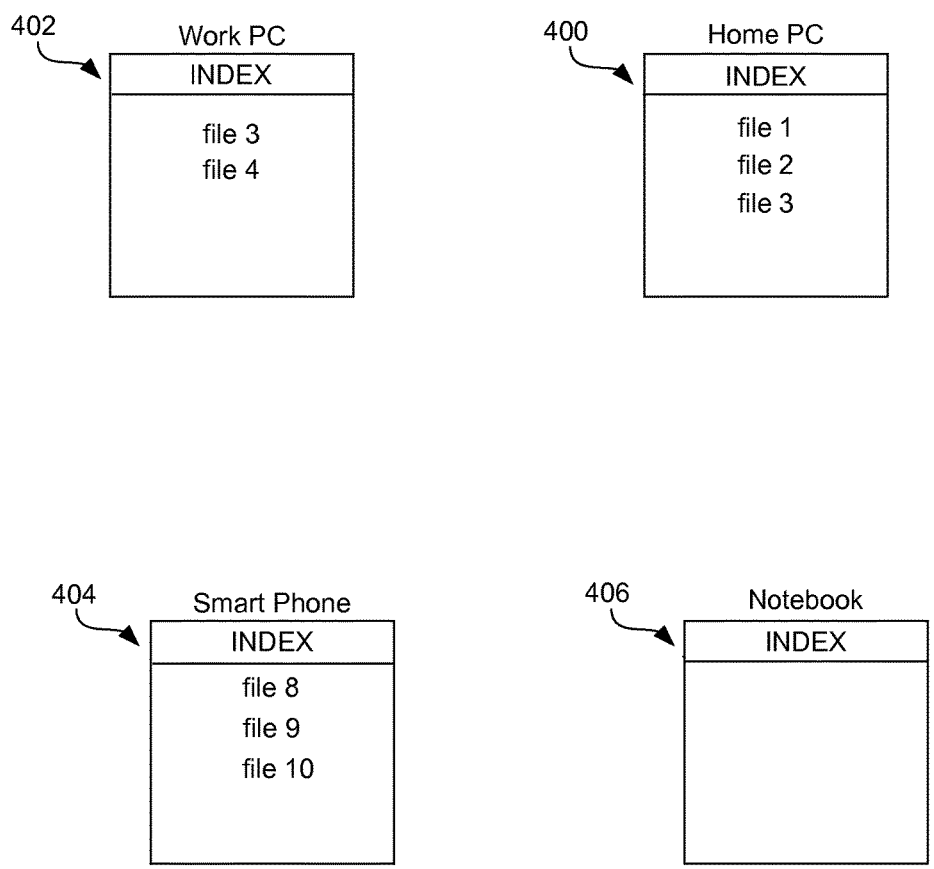
FIG. 4 illustrates an exemplary diagram of data storage provided at a plurality of different computing devices according to one embodiment of the invention.

FIG. 4 illustrates an exemplary diagram of data storage provided at a plurality of different computing devices according to one embodiment of the invention. The data storage available to a particular user is aggregated from data storage available from each of the different computing devices. The different computing devices are, according to one example, Home PC, Work PC, Smart Phone and Notebook computer.

The data storage depicted in FIG. 4 represents data storage at each of the different computing devices. The data storage at each of the different computing devices can include an index and zero or more electronic data files. In a first data representation 400, the Home PC stores an index and a plurality of electronic data files, namely, file 1, file 2 and file 3. In a second data representation 402, the Work PC stores an index and a plurality of electronic data files, namely, files 3 and 4. Here, file 3 stored at the Work PC may be identical to the file 3 stored in the Home PC, or such files may be different versions of the same file. In a third data representation 404, the Smart Phone (i.e., multi-function mobile telephone) stores an index and a plurality of electronic data files, namely, files 8, 9 and 10. In a fourth data representation 406, the Notebook computer stores an index but presently does not store any user files.

FIG. 5 illustrates an exemplary representation 500 of an index according to one embodiment on the invention. The index describes various data items that are available to a particular user throughout the different computing devices 102-108 that have been associated with the particular user. In other words, the index describes data in a distributed personal data bank that is available to a particular user.

As to the exemplary representation 500 depicted in FIG. 4, the index identifies a plurality of files, namely, file 1, file 2, file 3, file 4, file 8, file 9 and file 10. Thus, the index in the exemplary representation 500 corresponds to and is descriptive of the aggregated data storage provided by the different computing devices as shown in FIG. 4.

Each of these identified files can further be located or characterized through additional information provided in the index. As such, the index can indicate at least a location for each of the corresponding files. The location can specify a network address, such as a URL, for the corresponding file. The index can further indicate additional information, such as size, format and timestamp for each of the files identified in the index. The size can pertain to the file size, resolution, scale and the like. The size pertaining to a file size can be denoted as a quantity (e.g., megabytes (MB)). The format can pertain to file format or content format. For example, in the exemplary representation 500 illustrated in FIG. 5, the formats of the particular files within the index are provided as one of: Portable Document Format (pdf), Joint Photographic Experts Group (JPEG), or Microsoft Word (e.g., Word). The timestamps for the files can indicate creation or modification date (e.g., year, month, day, hour, minute and second). The index could also include version information if versioning were automatically imposed to on commonly named files.

Although these files in the exemplary representation 500 of the index are files associated with data storage of the computing devices associated with a particular user, it should be understood that in other embodiments data storage associated with one or more computing devices can be accessed even though not associated with the particular user. Here, to the extent authorized by the another user, the particular user is able to access data storage for a computing device primarily associated with a different user. Nevertheless, in such cases, the different user can authorize the particular user to have access to certain limited data.

Figure 6:
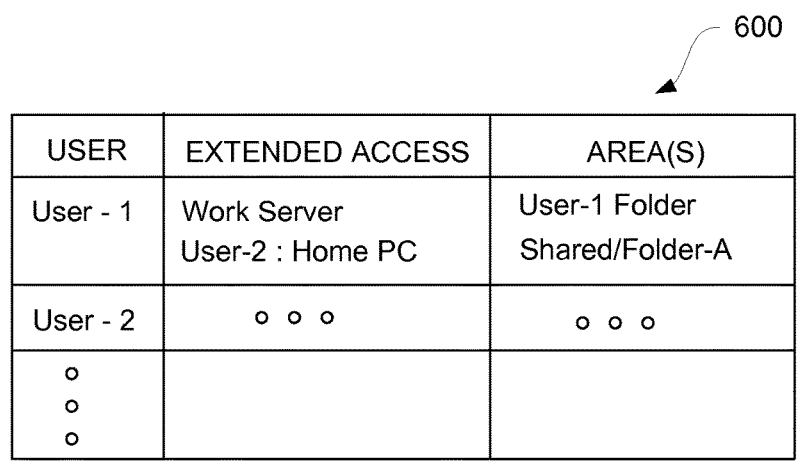
FIG. 6 illustrates an exemplary extended authorization table according to one embodiment of the invention.

FIG. 6 illustrates an exemplary extended authorization table 600 according to one embodiment of the invention. The extended authorization table 600 indicates that a particular user (user-1) is permitted to access a specifically identified work server ("Work Server") where access is restricted to a particular area (e.g., electronic folder) identified as "User-1 Folder". The extended authorization table 600 also indicates that the particular user (user-1) is also permitted to access a specifically identified shared data residing at the Home PC associated with another user (user-2), though such shared access is restricted to a particular area (e.g., folder) identified as are "Shared/Folder-A" which can represent a folder with a shared directory of the home personal computer (Home PC) of the another user.

In the distributed data environment described herein, a user is able to gain access to data associated with the user even though such data is distributed across a number of different computing devices that are associated with the user. Typically, the data need not be moved throughout the distributed data environment unless requested by an authorized user. However, in one embodiment, it can be advantageous to automatically distribute certain data to certain computing devices so that the data is more readily available, such as at reduced latency, to the authorized user. When data is automatically distributed in this fashion, the data can be stored at the data storage of the recipient computing device for non-volatile storage. Further, if the recipient computing device supports cache data storage, the data can be alternatively or additionally stored in the cache memory which is volatile storage. Similarly, in another embodiment, it can be advantageous to automatically distribute certain data to certain computing devices so that at least a portion of the data is redundantly stored, which can provide an automatic back-up function. The back-up data can be distributed across the computing devices or could be centrally stored.

Figure 7:
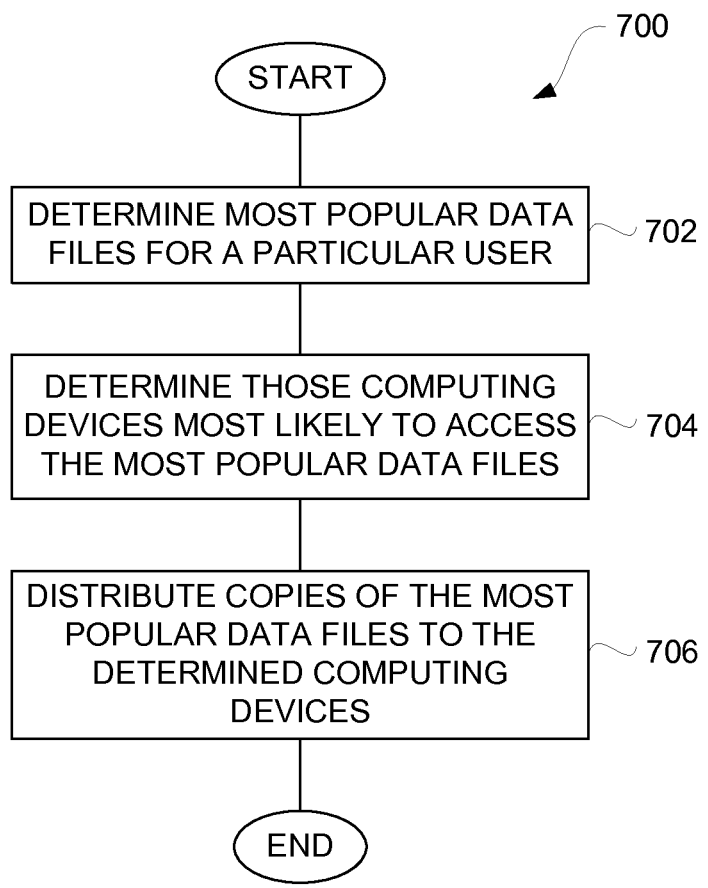
FIG. 7 is a flow diagram of a data distribution process according to one embodiment of the invention.

FIG. 7 is a flow diagram of a data distribution process 700 according to one embodiment of the invention. The data distribution process 700 can be carried out within the distributed data management system 100 illustrated in FIG. 1. For example, in one embodiment, the data bank server 116 can operate to perform the data distribution process 700.

The data distribution process 700 can determine 702 most popular data files for a particular user. For example, the most popular data files can be data files most often or most likely to be accessed in the immediate future by the particular user. In one implementation, by examining user actions or habits, the most popular data files can be dynamically determined in an automated fashion. Next, the data distribution process 700 can determine 704 those of a plurality of computing devices that are most likely to access the most popular data files. Copies of the most popular data files can then be distributed 706 to the one or more computing devices determined to be most likely to access the most popular data files. Following the block 706, the data distribution process 700 can end.

Figure 8:
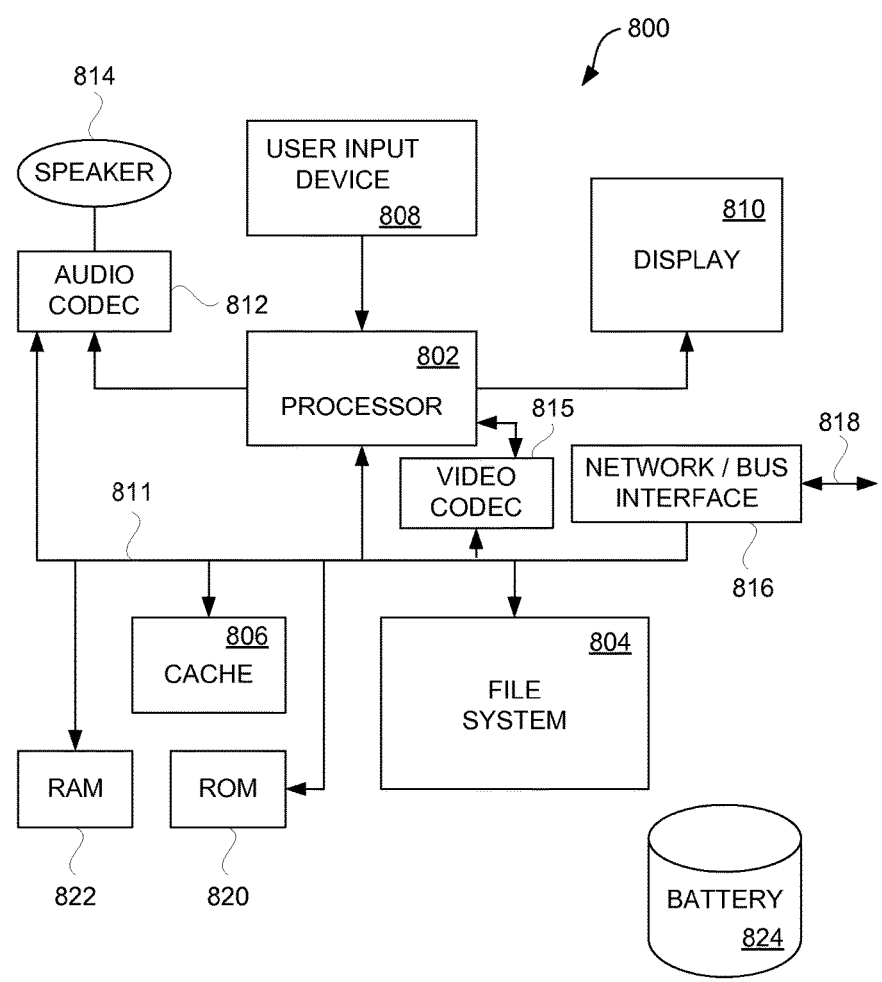
FIG. 8 shows an exemplary computer system suitable for use with at least one embodiment of the invention.

The computing device can, for example, be a portable electronic device. FIG. 8 is a block diagram of a computing device 800 suitable for use with the invention. The computing device 800 illustrates circuitry of a representative portable electronic device.

The computing device 800 includes a processor 802 that pertains to a microprocessor or controller for controlling the overall operation of the computing device 800. The computing device 800 stores data pertaining to electronic files in a file system 804 and a cache 806. The file system 804 is, typically, semiconductor memory (e.g., Flash memory) and/ or one or more storage disks. The file system 804 typically provides high capacity storage capability for the computing device 800. However, since the access time to the file system 804 can be relatively slow, the computing device 800 can also include the cache 806. The cache 806 is, for example, Random-Access Memory (RAM) provided by semiconductor memory. The relative access time to the cache 806 is typically shorter than for the file system 804. However, the cache 806 does not have the large storage capacity of the file system 804. Further, the file system 804, when active, consumes more power than does the cache 806. The power consumption is often a concern when the computing device 800 is a portable computing device that is powered by a battery 824. The computing device 800 also includes a Read-Only Memory (ROM) 820 and a RAM 822. The ROM 820 can store programs, utilities or processes to be executed in a non-volatile manner. The RAM 822 provides volatile data storage, such as for the cache 806.

The computing device 800 also includes a user input device 808 that allows a user of the computing device 800 to interact with the computing device 800. For example, the user input device 808 can take a variety of forms, such as a button, keypad, dial, touch-sensitive surface, etc. Still further, the computing device 800 includes a display 810 (screen display) that can be controlled by the processor 802 to display information to the user. A data bus 811 can facilitate data transfer between at least the file system 804, the cache 806, the processor 802, an audio coder/decoder (CODEC) 812 and/or a video CODEC 815.

In one embodiment, the computing device 800 serves to store a plurality of media items (e.g., songs, videos, podcasts, etc.) in the file system 804. When a user desires to have the computing device play a particular media item, a list of available media items is displayed on the display 810. Then, using the user input device 808, a user can select one of the available media items. The processor 802, upon receiving a selection of a particular media item, supplies the media data to one or more appropriate output devices. If the particular media item is encrypted, the particular media item is first decrypted as noted above, which could involve one or more layers of encryption. As an example, for audio output, the processor 802 can supply the media data (e.g., audio file) for the particular media item to the audio CODEC 812. The audio CODEC 812 can then produce analog output signals for a speaker 814. The speaker 814 can be a speaker internal to the computing device 800 or external to the computing device 800. For example, headphones or earphones that connect to the computing device 800 would be considered an external speaker. As another example, for video output, the processor 802 can supply the media data (e.g., video file) for the particular media item to the video CODEC 815. The video CODEC 815 can then produce output signals for the display 810 and/or the speaker 814.

The computing device 800 also includes a network/bus interface 816 that couples to a data link 818. The data link 818 allows the computing device 800 to couple to another device (e.g., another computing device, server computer, a host computer, or an accessory device). The data link 818 can be provided over a wired connection or a wireless connection. In the case of a wireless connection, the network/bus interface 816 can include a wireless transceiver. The data link 818 can, in some cases, also provide power to the computing device 800 (e.g., to charge the battery 824).

A portable electronic device illustrated in FIG. 8 may, but need not, be a hand-held electronic device. The term handheld generally means that the electronic device has a form factor that is small enough to be comfortably held in one hand. A hand-held electronic device may be directed at one-handed operation or two-handed operation. In one-handed operation, a single hand is used to both support the device as well as to perform operations with the user interface during use. In two-handed operation, one hand is used to support the device while the other hand performs operations with a user interface during use or alternatively both hands support the device as well as perform operations during use. In some cases, the hand-held electronic device is sized for placement into a pocket of the user. By being pocket-sized, the user does not have to directly carry the device and therefore the device can be taken almost anywhere the user travels. Even smaller, and thus more portable devices, are wearable electronic devices.

In general, electronic files included within the aggregated data storage provided across computing devices associated with a user can pertain any of a variety of different type of data. For example, one or more of the electronic files might pertain to word processing documents, spreadsheets, databases, contacts, media content (audio, video, image), etc.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for accessing distributed data, said method comprising:
    associating a plurality of different computing devices to a particular user;
    forming a distributed personal data bank using data storage of the different computing devices;
    maintaining an index of electronic data available in the distributed personal data bank, the index being available and maintained on the different computing devices via one or more wired or wireless networks; and
    accessing electronic data in the distributed personal data bank using the index, the data in the distributed personal data bank being accessible from the data storage of the different computing devices via the one or more wired or wireless networks, said accessing comprising:
        receiving a request for a specific electronic file from the distributed personal data bank;
        determining whether the distributed personal data bank stores the specific electronic file on two or more different ones of the different computing devices;
        selecting one of the two or more different ones of the different computing devices from which to retrieve the specific electronic file, the selecting being based at least in part on one or more characteristics associated with the specific electronic file that are acquired from the index; and
        retrieving the specific electronic file from the selected one of the two or more different ones of the different computing devices.

2. The method as recited in claim 1, wherein said accessing accesses a particular electronic file from the distributed personal data bank and provides the particular electronic file to a target computing device, the target computing device being one of the different computing device associated to the particular user.

3. The method as recited in claim 1, wherein said accessing comprises:
    determining whether the particular electronic file is usable by the target computing device; and
    modifying the particular electronic file to be usable by the target computing device if it is determined that the particular electronic file is not usable by the target computing device.

4. The method as recited in claim 3, wherein said modifying modifies at least one of size, resolution or format of the particular electronic file.

5. The method as recited in claim 1, wherein the index allows accessing data in the distributed personal data bank without regard to where the data is stored within the distributed personal data bank.

6. The method as recited in claim 1, wherein the index allows searching for data in the distributed personal data bank without regard to where the data is stored within the distributed personal data bank.

7. The method as recited in claim 1, wherein at least a portion of the data stored in the distributed personal data bank is redundantly stored.

8. The method as recited in claim 1, wherein a given data item can be stored in the distributed personal data bank with automatic versioning control.

9. The method as recited in claim 1, wherein the different computing devices are primarily devices used or owned by the particular user.

10. The method as recited in claim 1, wherein at least one of the computing devices is a device primarily used or owned by another user, yet such computing device stores data that is authorized as accessible to the particular user.

11. The method as recited in claim 1, wherein said method further comprises:
    determining most likely accessed data for the particular user; and
    automatically distributing the most likely accessed data to one or more of the different computing device associated with the particular user.

12. The method as recited in claim 11, wherein said method further comprises:
    caching the most likely accessed data at the one or more of the different computing devices associated with the particular user.

13. The method as recited in claim 1, wherein said method further comprises:
    determining most popular electronic files for the particular user;
    determining one or more of the different computing devices from which the particular user is most likely to access the most popular electronic files; and
    automatically distributing copies of the most popular electronic files to the most popular electronic files to the one or more of the different computing devices from which the particular user is determined to be most likely to access the most popular electronic files.

14. A method for accessing distributed data, said method comprising:
    associating a plurality of different computing devices to a particular user;
    configuring distributed data policies applicable to data stored on the different computing devices;
    maintaining an index of data available to the particular user on the different computing devices via one or more wired or wireless networks; and
    subsequently accessing the electronic data available to the particular user on the different computing device from any of the different computing devices using the index without regard to where the electronic data is stored within the different computing devices, wherein said accessing comprises:
- receiving a request for a specific electronic file from the distributed personal data bank;
- determining whether the distributed personal data bank stores the specific electronic file on two or more different ones of the different computing devices;
- selecting one of the two or more different ones of the different computing devices from which to retrieve the specific electronic file, the selecting being based at least in part on the one or more characteristics associated with the specific electronic file stored on the two or more different ones of the different computing device; and
- retrieving the specific electronic file from the selected one of the two or more different ones of the different computing devices.

15. The method as recited in claim 14, wherein the distributed data policies comprise at least one policy on data retention.

16. The method as recited in claim 14, wherein the distributed data policies comprises at least one access location preference.

17. A non-transitory computer readable medium including at least computer program code stored thereon and executable by a computing device for accessing distributed data, said computer readable medium comprising:
- computer program code for associating a plurality of different computing devices to a particular user;
- computer program code for forming a distributed personal data bank using data storage of the different computing devices;
- computer program code for maintaining an index of electronic data available in the distributed personal data bank, the index being available and maintained on the different computing devices; and
- computer program code for accessing electronic data in the distributed personal data bank using the index, the data in the distributed personal data bank being accessible from the data storage of the different computing devices, said accessing comprising:
  - receiving a request for a specific electronic file from the distributed personal data bank;
  - determining whether the distributed personal data bank stores the specific electronic file on two or more different ones of the different computing devices;
  - selecting one of the two or more different ones of the different computing devices from which to retrieve the specific electronic file, the selecting being based at least in part on one or more characteristics associated with the specific electronic file that are acquired from the index; and
  - retrieving the specific electronic file from the selected one of the two or more different ones of the different computing devices.

18. The computer readable medium as recited in claim 17, wherein said computer program code for searching the distributed personal data bank using the index.

* * * * *